United States Patent
Gericke et al.

(10) Patent No.: US 7,269,956 B2
(45) Date of Patent: Sep. 18, 2007

(54) DEVICE FOR UTILIZING THE WASTE HEAT OF COMPRESSORS

(75) Inventors: Bernd Gericke, Köln (DE); Gerd-Ulrich Woelk, Oberhausen (DE); Pavle Kuzmanovski, Berlin (DE)

(73) Assignee: MAN TURBO AG (DE)

( * ) Notice: Subject to any disclaimer, the term of this patent is extended or adjusted under 35 U.S.C. 154(b) by 284 days.

(21) Appl. No.: 10/960,375

(22) Filed: Oct. 7, 2004

(65) Prior Publication Data

US 2005/0235625 A1    Oct. 27, 2005

(30) Foreign Application Priority Data

Apr. 27, 2004  (DE) .................. 10 2004 020 753

(51) Int. Cl.
*F02C 6/18* (2006.01)
*F02C 7/143* (2006.01)

(52) U.S. Cl. ..................... 60/782; 60/39.182

(58) Field of Classification Search .......... 60/728, 60/39.182
See application file for complete search history.

(56) References Cited

U.S. PATENT DOCUMENTS 4,342,201 A    8/1982   Ishii 5,386,685 A    2/1995   Frutschi
2004/0035117 A1  2/2004  Rosen

FOREIGN PATENT DOCUMENTS

| DE | 32 24 577 A1 | 1/1984 |
|---|---|---|
| DE | 0 597 305 B2 | 5/1994 |
| DE | 101 55 508 A1 | 8/2002 |
| EP | 0 597 305 A1 | 5/1994 |
| GB | 2 307 277 A | 5/1997 |
| JP | 11-343865 | * 12/1999 |
| WO | WO 02/04796 | * 1/2002 |

* cited by examiner

*Primary Examiner*—Ted Kim
(74) *Attorney, Agent, or Firm*—McGlew and Tuttle P.C.

(57) ABSTRACT

An intercooler (3) is provided with heat exchanger surfaces (6) and is arranged in the gas stream between two compressors (1, 2) or two compressor stage groups for compressing a gas. An aftercooler (5) is also provided with heat exchanger surfaces (7) and is arranged after the second compressor (2). To utilize the waste heat generated in the coolers (3, 5), the heat exchanger surfaces (6, 7) of the intercooler (3) and of the aftercooler (5) are integrated in a steam generator (9) in such a way that the heat exchanger surfaces are connected with the feedwater pump (40, 59) of the steam generator (9).

16 Claims, 2 Drawing Sheets

DEVICE FOR UTILIZING THE WASTE HEAT OF COMPRESSORS

CROSS REFERENCE TO RELATED APPLICATIONS

This application claims the benefit of priority under 35 U.S.C. § 119 of DE102004020753 filed Apr. 27, 2004, the entire contents of which are incorporated herein by reference.

FIELD OF THE INVENTION

The present invention pertains to a device for utilizing the waste heat of a compressor or of a plurality of series-connected compressors or compressor stage groups for compressing a gas using an intercooler, which is always arranged in the gas flow between a first and said second compressor or two compressor stage groups and is provided with heat exchanger surfaces, wherein the heat exchanger surfaces are connected with a steam generator having one or more feedwater preheaters, one or more evaporators, one or more superheaters, a condenser, a degasser and a feedwater pump for a steam turbine driving a generator.

BACKGROUND OF THE INVENTION

The drive power of the compressors may be considerably reduced by the intermediate cooling of the compressed medium in a compression process. The heat of the intercooler, which is to be removed, has usually been hitherto removed unused into the atmosphere.

A combined gas and steam power plant with a two-stage compressor for compressing the combustion air fed into the combustion chamber of the gas turbine is known from EP 0 597 305 B2. An intercooler, whose heat exchange surfaces are integrated in the water-steam circuit of the waste heat boiler arranged downstream of the gas turbine, is arranged between the two compressor stages. Feedwater, whose pressure was previously raised by a booster pump, is fed into the intercooler. The feedwater heated in the intercooler is fed to a steam collecting drum, in which it partially evaporates. The steam thus formed is introduced into the superheater, and the water is introduced into the mixed preheater. The principle of heat release is thus achieved by the re-evaporation of the cooling water being circulated in the drum. The extent of the heat release is thus strongly affected by the particular steam pressure in the drum.

The combined plant known from EP 0 597 305 B2 with the utilization of the waste heat of the compressor requires an additional booster pump for the cooling circuit besides the feedwater pump, which is present anyway. The waste heat of the compressor is utilized in the medium peculiar to the plant, namely, the compressed combustion air. Only the compressor heat that is generated in the intercooler is utilized.

SUMMARY OF THE INVENTION

Unlike in the state of the art according to EP 0 597 305 B2, in which the pure power generation process is considered, the present invention is aimed at integrating a power generation process in industrial compressor processes, e.g., in the petrochemical industry or in the delivery of gas through pipelines.

The basic object of the present invention is to make the device of this class useful for utilizing the compressor waste heat for industrial compressor plants.

According to the invention, a device for utilizing the waste heat of one or more series-connected compressors or compressor stage groups for compressing a gas is provided having an intercooler. The intercooler is arranged in the gas flow between a first and a second compressor or between two compressor stage groups and is provided with heat exchanger surfaces. The heat exchanger surfaces are connected with a steam generator having one or more feedwater preheaters, one or more evaporators, one or more superheaters, a condenser, a degasser and a feedwater pump for a steam turbine driving a generator. An aftercooler is arranged downstream of the second compressor (or compressor stage group) and the heat exchanger surfaces of the intercooler and heat exchanger surfaces of the aftercooler are in connection with the feedwater pump of the steam generator.

At at least one of the heat exchanger surfaces of the intercooler may be connected as a feedwater preheater, which is in connection with a high-pressure feedwater pump of the steam generator. A water/water heat exchanger may be arranged upstream of the feedwater preheater of the steam generator or of the heat exchanger surface of the intercoolers, which heat exchanger surface is connected as a feedwater preheater.

The compressors may be driven by a gas turbine, which is followed by a waste heat boiler with a high-pressure part and with a low-pressure part. In such case, the feedwater flows through the heat exchanger surfaces of the intercoolers and the heat exchanger surfaces are connected with one or more feedwater preheaters of a high-pressure part of the waste heat boiler of the gas turbine. The waste heat boiler may be provided with an auxiliary firing unit.

A feedwater preheater and a first evaporator may be arranged in the intercooler as a heat exchanger surface. A second evaporator, which is connected in parallel with the first evaporator via a cylinder or a steam collecting drum, as well as a superheater of a supercharged low-pressure steam generator may be arranged as a heat exchanger surface in the aftercooler. The superheater may be connected with the inlet side of a low-pressure steam turbine via a steam line. A branch line, which is led to a degasser of the low-pressure steam generator, may be branched off from the steam line before the entry into the low-pressure steam turbine.

The device according to the present invention may be used in both compressor plants that are driven by a gas turbine with a downstream waste heat boiler and motor-driven compressor plants. In the former case, the present invention is characterized by a reduction of the overall energy requirement due to the elimination of the circulating pumps for the cooling circuit, because the delivery of the amount of cooling water as high-pressure feedwater is brought about by the feedwater pump, which is present anyway. In addition, the use of fuel is reduced under otherwise identical general conditions. There is a reduction in the power consumption that can be taken into account from the electric network in the case of compressors driven by electric motors, because the generator driven by the steam turbine can supply energy into the electric network.

A plurality of exemplary embodiments of the present invention are shown in the drawings and will be explained in greater detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
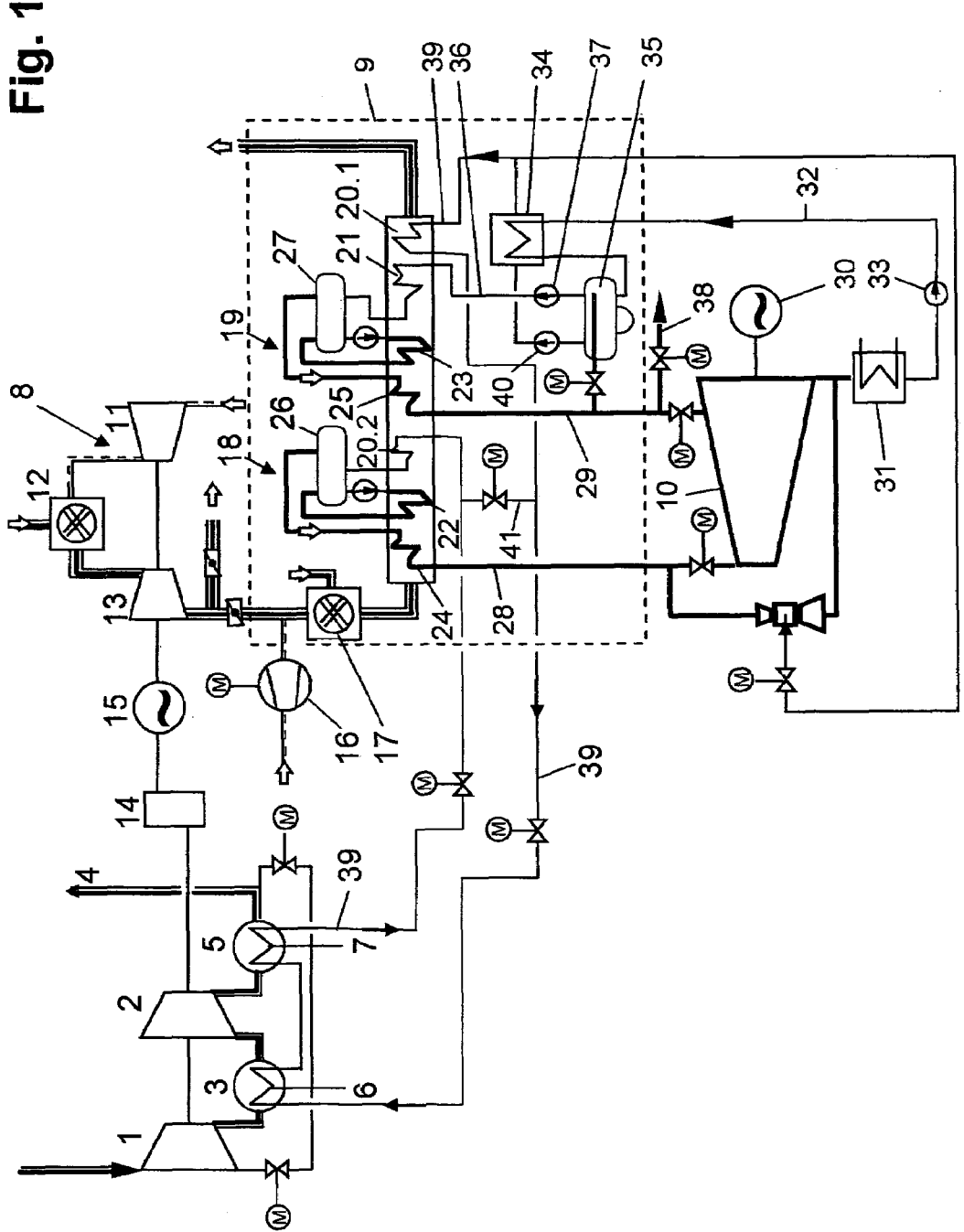
FIG. 1 is a schematic diagram of a compressor plant having compressors that are driven by a gas turbine.

The compressor station being shown comprises two compressors 1, 2 or compressor stage groups arranged in series. The compressor station is used to compress gas in a petrochemical plant or in an intermediate station of a pipeline for delivering gas or similar applications. To reduce the drive power for the compressors 1, 2, an intercooler 3 is arranged in the gas flow between the compressors 1, 2, and an aftercooler 5 is arranged in the line 4 leading to the end user behind the second compressor 2 to limit the gas temperature. The intercooler 3 and the aftercooler 5 are provided with heat exchange surfaces 6, 7. It is also possible to provide more than two compressors or compressor stage groups in the compressor station, with an intercooler 3 being arranged between two compressors and the aftercooler 5 being arranged after the last compressor.

The compressor station shown in FIG. 1 is driven by a gas turbine plant 8, which is followed by a waste heat boiler 9 in connection with a steam turbine 10. The gas turbine plant 8 comprises a combustion air compressor 11, a combustion chamber 12 and the gas turbine 13 proper. The output shaft of the gas turbine 13 is coupled with the compressors 1, 2 via a gear mechanism 14. A gas turbine generator 15, which supplies electric energy into the internal or public electric network, is arranged on the output shaft of the gas turbine 13. If gas turbines of the power class of 10-25 MW are used, the necessary overall drive powers of the compressors 1, 2 can be reached only by means of higher outputs of the steam turbine 10 and consequently by increased firing temperatures in the waste heat boiler 9. The gas turbine 13 and the steam turbine 10 are designed as a single-shaft line in this case. Such a single-shaft line is not shown because of the simplified view.

An auxiliary firing unit 17 with a fresh air ventilator 16 may be provided after the gas turbine 13 in the exhaust gas stream. The plant is controlled in the case of the above-mentioned single-shaft line exclusively via the auxiliary firing unit, as a result of which maximum flexibility is achieved during partial load operation and under changing intake conditions of the compressors 1, 2. If the gas turbine drive power is sufficient for the compressors 1 and 2, the steam turbine circuit is utilized exclusively for power generation or as a power-heat coupling plant. At a corresponding partial load of the gas turbine or in case of an emergency shutdown of the gas turbine 13, the conditions of the steam turbine circuit can be kept constant via the installed auxiliary firing unit 17 and via the fresh air ventilator 16. If the plant is designed as a single-shaft line with the above-mentioned object, the gas turbine generator shown in FIG. 1 may be designed as a motor/generator system. In case of failure of the steam turbine 10 and the gas turbine 13, the necessary power of the compressors 1, 2 can be provided from the network. The motor/generator system now operates in the so-called motor mode. In addition, the electric efficiency of the overall process increases with decreasing load, because the share of the gas turbine within the overall power increases.

The waste heat boiler 9 is designed as a mixed-pressure boiler with or without combustion chamber tubes. It contains, as is schematically shown in FIG. 1, a high-pressure part 18 and a low-pressure part 19, which have a feedwater preheater 20, 21 each, an evaporator 22, 23 each, and a superheater 24, 25 each. The feedwater preheater 20 of the high-pressure part 18 is composed of a first feedwater preheater 20.1 and a second feedwater preheater 20.2. The respective feedwater preheaters 20.2, 21, evaporators 22, 23 and superheaters 24, 25 are in connection with an external steam collecting drum 26, 27 each when these components are operated in the natural circuit or in forced circulation.

The superheater 24 of the high-pressure part 18 is connected with the inlet or high-pressure part of the steam turbine 10 via a high-pressure steam line 28 and the superheater 25 of the low-pressure part 19 is connected with the low-pressure part of the gas turbine 10 via a low-pressure steam line 29. The steam turbine 10 drives a generator 30 for generating energy in this exemplary embodiment.

The outlet of the steam turbine 10 is connected with a condenser 31. A condensate line 32 is connected to the condenser 31. The condensate line 32 has a condensate pump 33 arranged to lead to a degasser 35 via a water/water heat exchanger 34. Via a low-pressure feedwater line 36, in which a low-pressure feedwater pump 37 is arranged, the degasser 35 is connected with the feedwater preheater 21 of the low-pressure part 19 of the waste heat boiler 9.

The degassing of the condensate is brought about by low-pressure steam from the low-pressure part 19 of the waste heat boiler 9. Another part of the low-pressure steam can be fed via a branch line 38 branching off from the low-pressure steam line 29 to an external user, advantageously for long-distance heat supply, for preheating the fuel or as process steam.

To utilize the waste heat potentials generated in the intercooler 3 and the aftercooler 5, the heat exchange surfaces 6, 7 of the intercooler 3 and of the aftercooler 5 are integrated in the water-steam circuit of the waste heat boiler 9 arranged downstream of the gas turbine 13. A high-pressure feedwater line 39, in which a high-pressure feedwater pump 40 is arranged, is connected for this purpose to the degasser 35. The high-pressure feedwater line 39 is led through the water/water heat exchanger 34 and is connected to the first feedwater preheater 20.1 of the high-pressure part 18 of the waste heat boiler 9, which is arranged in the area of the outlet of the waste heat boiler 9 at which the turbine waste gas has reached its lowest temperature. In the water/water heat exchanger 34 located outside the waste heat boiler 9, the temperature of the feedwater at the inlet into the first feedwater preheater 20.1 is reduced by the condensate to the extent that the exhaust gas temperature can be reduced even further after the waste heat boiler 9. The first feedwater preheater 20.1 is an additional heat sink in this cooperation at the cold end of the waste heat boiler 9. Such a heat sink is necessary to reach an economical gas discharge temperature because the utilization of the external waste heat of the compressors 1, 2 would otherwise lead to reduced waste heat utilization of the turbine exhaust gases when pre-evaporation is avoided in the second feedwater preheater 20.2 of the high-pressure part 18, which said feedwater preheater 20.2 is located in the hotter part of the waste heat boiler 9.

The high-pressure feedwater line 39 is led farther from the first feedwater preheater 20.1 arranged at the cold end of the waste heat boiler 9 to the heat exchange surface 6 of the intercooler 3 and from there to the heat exchange surface 7 of the aftercooler 5. After the aftercooler 5, the high-pressure feedwater line 39 connects the heat exchange surface 7 of the aftercooler 5 with the second feedwater preheater 20.2 of the high-pressure part 18 of the waste heat boiler 9. The heat exchange surfaces 6, 7 in the intercooler 3 and in the aftercooler 5 can be advantageously bypassed when necessary via a bypass line 41 that can be shut off by means of a valve, as a result of which the feedwater reaches the second feedwater preheater 20.2 of the high-pressure part 18 directly from the first feedwater preheater 20.1.

Due to the described connection of the surfaces involved in the heat exchange, the waste heat generated in the intercooler 3 and in the aftercooler 5 is transferred in the plant shown in FIG. 1 to the feedwater, which is fed into the high-pressure part of the waste heat boiler 9 and of the steam turbine 10 by means of a high-pressure feedwater pump 40 via the heat exchange surfaces 6, 7 of the coolers 3, 5. The electric output of the steam turbine can be increased by about 25% with the consumption of an equal amount of fuel due to the utilization of the waste heat of the compressors 1, 2.

Figure 2:
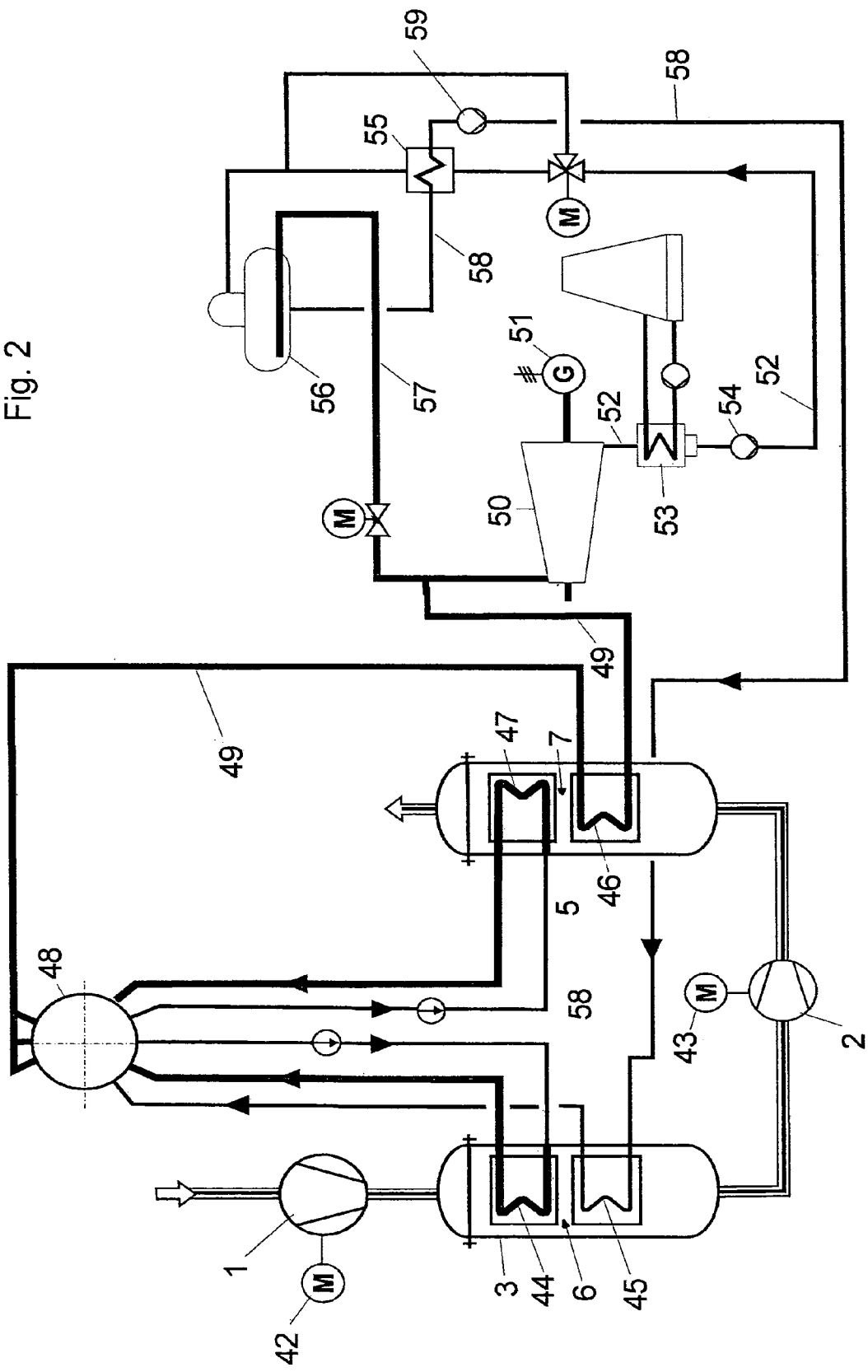
FIG. 2 is a schematic diagram of a compressor plant driven by an electric motor with utilization of the waste heat of the compressor.

If the compressors 1, 2 are driven by an electric motor to compress a gas, the waste heat of the compressors 1, 2, which is removed via the coolers 3, 5, can be utilized by means of the water-steam circuit of a low-pressure steam generator, which is shown in FIG. 2. The compressors 1, 2 are connected with an electric motor 42, 43 as a drive or, connected in series, they are driven with a single electric motor as the drive. The intercooler 3 is located in turn in the gas stream between the two compressors 1, 2 or compressor stage groups connected in series, and the aftercooler 5 is arranged in the line 4 leading to an end user. The heat exchange surfaces 6, 7 of the coolers 3, 5 are connected as heating surfaces of a supercharged low-pressure steam generator, as a result of which forced circulation evaporators are preferably used because of the high heat densities prevailing here.

Viewed in the direction of the gas flow, a first evaporator 44, designed as a forced circulation evaporator, and a feedwater preheater 45 are arranged in the intercooler 3. Viewed in the direction of the gas flow, a superheater 46 and a second evaporator 47, designed as a forced circulation evaporator, are arranged in the aftercooler 5. The two evaporators 44, 47 are in connection with a steam collecting drum 48. The steam generator may also be designed as a forced flow-through steam generator. In case of forced flow-through evaporators, the steam collecting drum 48 may be replaced by a separator.

The superheater 46 is connected with the steam space of the steam collecting drum 48 on the inlet side and with the inlet side of a steam turbine 50 via a steam line 49 on the outlet side. The steam turbine 50 drives a generator 51 for generating electricity in this example.

A condenser 53 is connected to the outlet of the steam turbine 50 via a condensate line 52. The condensate line 52, in which a condensate pump 54 is arranged, is led via a water/water heat exchanger 55 to a degasser 56. A steam branch line 57 is branched off from the steam line 49 before it enters the steam turbine 50 and is led to the degasser 56.

A feedwater line 58 with a feedwater pump 59 is connected to the degasser 56. The feedwater line 58 is led through the water/water heat exchanger 55 and is connected with the inlet of the feedwater preheater 45.

While the release of heat takes place on the high-pressure side of the steam generator in the plant shown in FIG. 1 due to the use of the high-pressure feedwater as the cooling medium, this takes place by means of the components of a low-pressure steam generator, such as a superheater, evaporator and feedwater preheater in the plant according to FIG. 2. Thus, the heat is released on the basis of steam via low-pressure systems in case of motor-driven compressors. The steam generated is used to generate electricity in a low-pressure steam turbine designed specifically for this purpose, as is shown in FIG. 2, or is sent to the low-pressure side of an existing steam turbine. In addition, the steam generated may be used to provide long-distance heat, process steam and to preheat fuel.

While specific embodiments of the invention have been shown and described in detail to illustrate the application of the principles of the invention, it will be understood that the invention may be embodied otherwise without departing from such principles.

What is claimed is:

1. A device for utilizing the waste heat of one or more series-connected compressors or compressor stage groups for compressing a gas, the device comprising:
    an intercooler arranged in the gas flow between a first and said second of the compressors or between two of the compressor stage groups, said intercooler having heat exchanger surfaces;
    a steam turbine driving a generator;
    a steam generator, said intercooler heat exchanger surfaces being operatively connected to said steam generator, said steam generator having a feedwater preheater, an evaporator, a superheater, a condenser, a degasser and a feedwater pump for said steam turbine;
    an aftercooler with heat exchanger surfaces arranged downstream of said second compressor or downstream of said compressor stage groups, said intercooler heat exchanger surfaces and said aftercooler heat exchanger surfaces being in series flow communication with said feed preheater and in flow connection with said feedwater pump, said evaporator and said superheater of said steam generator.

2. A device in accordance with claim 1, wherein at least one of said intercooler heat exchanger surfaces is connected as said feedwater preheater, said feedwater preheater being in operative connection with said feedwater pump as a high-pressure feedwater pump of said steam generator.

3. A device in accordance with claim 1, further comprising a water/water heat exchanger arranged upstream of said feedwater preheater of said steam generator or upstream of said intercooler heat exchanger surface, which heat exchanger surface is connected as said feedwater preheater.

4. A device in accordance with claim 1, wherein the compressors are driven by a gas turbine which is followed by a waste heat boiler of said steam generator, said waste heat boiler having a high-pressure part and with a low-pressure part, wherein feedwater flows through the intercooler and aftercooler heat exchanger surfaces, and said intercooler and aftercooler heat exchanger surfaces are connected with one or more said feedwater preheaters of said high-pressure part of said waste heat boiler of said gas turbine.

5. A device in accordance with claim 4, wherein said waste heat boiler is provided with an auxiliary firing unit.

6. A gas compression and waste heat utilization system, comprising:
    series-connected compressors or compressor stage groups for compressing a gas;
    an intercooler with intercooler heat exchanger surfaces, said intercooler being arranged in gas flow connection between two of said series-connected compressors or between two of said compressor stage groups;
    an aftercooler with aftercooler heat exchanger surfaces, said aftercooler being arranged downstream of a last compressor of said series-connected compressors or downstream of said compressor stage groups;

a steam turbine driving a generator;

a steam generator for said steam turbine, said steam generator having a feedwater preheater, an evaporator, a superheater, a condenser, a degasser and a feedwater pump, said intercooler heat exchanger surfaces and said aftercooler heat exchanger surfaces being in series flow communication with said feed preheater and in flow connection with said feedwater pump of said steam generator to integrate said intercooler heat exchanger surfaces and said aftercooler heat exchanger surfaces into said steam generator.

7. A system in accordance with claim 6, wherein at least a portion of said intercooler heat exchanger is operatively connected as said feedwater preheater, said feedwater preheater bering in operative connection with said feedwater pump as a high-pressure feedwater pump of said steam generator.

8. A system in accordance with claim 6, further comprising a water/water heat exchanger arranged upstream of said feedwater preheater of said steam generator or upstream of said intercooler heat exchanger surface, said heat exchanger surface being connected as said feedwater preheater.

9. A system in accordance with claim 6, further comprising a gas turbine driving said compressors, said gas turbine being in operative connection with a waste heat boiler forming a part of said steam generator, said waste heat boiler having a high-pressure part and a low-pressure part, wherein feedwater flows through said intercooler and aftercooler heat exchanger surfaces and said intercooler and aftercooler heat exchanger surfaces are connected with one or more said feedwater preheaters of said high-pressure part of said waste heat boiler of said gas turbine.

10. A system in accordance with claim 9, wherein said waste heat boiler is provided with an auxiliary firing unit.

11. A gas compression and waste heat utilization system comprising:

series-connected compressors or compressor stage groups for compressing a gas;

an intercooler arranged in gas flow connection between two of said series-connected compressors or between two of said compressor stage groups;

an aftercooler arranged downstream of a last compressor of said series-connected compressors or downstream of said compressor stage groups;

a steam turbine;

a steam generator for said steam turbine, said steam generator having a feedwater preheater, an evaporator, and a superheater;

a feedwater pump flowing a fluid through a circuit including said intercooler, said aftercooler, and said feedwater preheater in series flow communication, and also said evaporator, said superheater, and said steam turbine.

12. A system in accordance with claim 11, wherein:

said steam generator also includes a condenser and a degasser;

said feedwater pump flows the fluid in series through said intercooler, said aftercooler, said feedwater preheater, said evaporator, said superheater, said steam turbine, said condenser, and said degasser.

13. A system in accordance with claim 11, wherein:

said steam turbine includes a high-pressure part and a low-pressure part, said circuit is a high-pressure circuit and includes said high-pressure part of said steam turbine;

said steam generator includes another feedwater preheater, another evaporator, and another superheater forming a low-pressure circuit connected to said low-pressure part of said steam turbine;

said steam generator has an inlet receiving a waste heat flow and having an outlet discharging the waste heat flow after the waste heat flow has generated steam in the steam generator;

said low-pressure circuit is arranged downstream of said high-pressure circuit in said steam generator with respect to the waste heat flow.

14. A system in accordance with claim 13, wherein:

said high-pressure circuit includes another feedwater preheater arranged upstream of said intercooler in said high-pressure circuit;

said another feedwater preheater is arranged downstream of said low-pressure circuit in said steam generator with respect to the waste heat flow.

15. A system in accordance with claim 13, further comprising:

a combustion engine powering said compressors or said compressor stage groups, exhaust from said combustion engine creating the waste heat flow through said steam generator.

16. A system in accordance with claim 15, further comprising:

an auxiliary firing unit generating a part of the waste heat flow entering said steam generator.

* * * * *